United States Patent
Tao et al.

(10) Patent No.: US 10,370,563 B2
(45) Date of Patent: Aug. 6, 2019

(54) WEATHER RESISTANT MATTE SILICONE COATING AND PREPARATION METHOD THEREOF

(71) Applicants: CHENGDU TALY TECHNOLOGY CO., LTD, Chengdu, Sichuan (CN); CHINA ACADEMY OF CIVIL AVIATION SCIENCE AND TECHNOLOGY, Beijing (CN)

(72) Inventors: Yunfeng Tao, Sichuan (CN); Yajie Shi, Sichuan (CN); Xianyin Zhang, Sichuan (CN); Ping Liu, Sichuan (CN); Hongyu Yao, Sichuan (CN); Hui Fang, Sichuan (CN); Hong Liu, Sichuan (CN)

(73) Assignees: Chengdu Taly Technology Co., Ltd., Sichuan (CN); China Academy of Civil Aviation Science and Technology, Beijing (CN)

( * ) Notice: Subject to any disclaimer, the term of this patent is extended or adjusted under 35 U.S.C. 154(b) by 163 days.

(21) Appl. No.: 15/541,425

(22) PCT Filed: Nov. 11, 2015

(86) PCT No.: PCT/CN2015/094334
§ 371 (c)(1),
(2) Date: Jul. 3, 2017

(87) PCT Pub. No.: WO2016/110155
PCT Pub. Date: Jul. 14, 2016

(65) Prior Publication Data
US 2018/0002568 A1  Jan. 4, 2018

(30) Foreign Application Priority Data
Jan. 8, 2015  (CN) .......................... 2015 1 0010408

(51) Int. Cl.
*C09D 183/06* (2006.01)
*C09D 183/04* (2006.01)

(52) U.S. Cl.
CPC ......... *C09D 183/06* (2013.01); *C09D 183/04* (2013.01)

(58) Field of Classification Search
CPC .......................... C09D 183/04; C09D 183/06
See application file for complete search history.

(56) References Cited

U.S. PATENT DOCUMENTS

| 8,217,113 B2 * | 7/2012 | Scheim ................... C08L 83/04 524/588 |
| 2011/0224366 A1 | 9/2011 | Scheim et al. |
| 2015/0011705 A1 | 1/2015 | Prasse et al. |

FOREIGN PATENT DOCUMENTS

| CN | 85103438 A | 10/1986 |
| CN | 101772551 A * | 7/2010 ............ C08L 83/04 |
| CN | 101772551 A | 7/2010 |
| CN | 102559047 A * | 7/2012 |
| CN | 102559047 A | 7/2012 |
| CN | 103834171 A * | 6/2014 |
| CN | 103834171 A | 6/2014 |
| CN | 104136446 A | 11/2014 |

OTHER PUBLICATIONS

International Search Report (PCT/ISA/210) dated Jan. 21, 2016, by the Chinese Patent Office as the International Searching Authority for International Application No. PCT/CN2015/094334.
Written Opinion (PCT/ISA/237) dated Jan. 21, 2016, by the Chinese Patent Office as the International Searching Authority for International Application No. PCT/CN2015/094334.

* cited by examiner

*Primary Examiner* — James C Goloboy

(57) ABSTRACT

A weather resistant matte silicone coating special for EMAS, comprising: 80~130 parts by weight of $\alpha,\omega$-dihydroxypolydimethylsiloxane; 0.5~10 parts by weight of a linear polydimethylsiloxane with terminal hydroxyl group; 1~10 parts by weight of fumed silica; 10~50 parts by weight of precipitated silica; 1~5 parts by weight of color masterbatch; 0.9~5 parts by weight of organotin chelate catalyst; crosslinking agent, comprising 1.5~7 parts by weight of methyltri(methylethylketoximino)silane, 1.5~7 parts by weight of vinyltri(methylethylketoximino)silane, and 1~7 parts by weight of aminopropyltriethoxysilane; 1.5~6 parts by weight of delustering agent; and 250~350 parts by weight of a solvent. The coating has the properties of low viscosity, high flow, relatively fast curing, moderate strength, good adhesion, good mattness, being environmentally friendly and the like.

12 Claims, No Drawings

WEATHER RESISTANT MATTE SILICONE COATING AND PREPARATION METHOD THEREOF

TECHNICAL FIELD

The present invention relates to a weather resistant matte silicone coating special for EMAS and preparation method thereof.

BACKGROUND ART

Although air travel is the safest way to travel in the world, aircrafts may overrun the runway in the process of taking off or landing due to operational errors, mechanical failure, bad weather and so on, causing serious accidents and accident proneness, which is one of the major threats to aviation safety. In recent years, with the continuous increase in flight volume, the occurrence of aircrafts overrunning the runway is also rising. Under such a situation that the overall accident rate in the civil aviation industry is steady with a little decrease, it has become a common task faced in the civil aviation industry about how to avoid serious accidents of crash and death after aircrafts overrunning the runway. Especially for some airports, it is difficult to build a runway end safety area that meets the requirements of length because of natural barriers (such as rivers and lakes, deep ditches, etc.), construction facilities, or other environmental factors limit outside the runway, or the construction cost is too high, or there is safety area that meets the minimum standards of ICAO (240 meters for airports of class 3 and 4) but the consequences are particularly serious in case of overrunning the end safe area. In response to these problems, the US has firstly developed the Engineered Material Arresting System (EMAS) as an alternative to the special airport that cannot be extended in the end safe area.

Engineered Material Arresting System (EMAS) is a crushable material with specific mechanical performance, which is, laid on the ground of the runway extension line in a thickness of tens of centimeters to form an arresting bed. Once an aircraft overruns the runway into the arresting bed, the crushable material is crushed under the rolling of the wheel, so as to absorb the kinetic energy of the aircraft, and to make the aircraft gradually slow down and eventually stop in the arresting bed under the premise that the aircraft and personnel safety is ensured. EMAS can provide the last reliable safety barrier for the aircraft overrunning the runway.

Therefore, the body material of the EMAS must have the following performances:
the body material has excellent waterproof ability;
the overall package of the arresting bed has excellent waterproofness;
the top cover (or cover plate) has excellent anti-ultraviolet and anti-aging ability;
having excellent weather resistance and being free from weather restrictions, namely, it can be used in wind, rain and snow;
safety to use: the entire system meets the requirements of flame retardance, fire resistance, non-toxic and environmental friendliness;
emergency rescue: having no hindrance to the passengers evacuation and emergency rescue vehicles closing to the aircraft;
design life: 20 years;
maintenance requirement: simple maintenance on a regular basis;
navigation and lighting facilities: no impact; and
the construction period: 60-80 days.

The cover plate of EMAS is made of a polyester material which has the problem of poor weather resistance and reflection. Poor weather resistance will lead to short service life; and reflection will interfere with the pilot's sight, causing flight accidents. Therefore, it is necessary to improve the mattness of the polyester cover plate. It is an efficient, economical and convenient measure to add a layer of matte special coating with good weather resistance to the surface of the polyester cover plate.

Single-component room-temperature cured silicone coating has excellent weather resistance, excellent resistance to high and low temperature and good water resistance. It can be long-term used in the range of −60~200° C. Its theoretical service life is up to 20 years. There are no heat absorbing and heat release during curing, and the shrinkage percentage is small after curing; it has good adhesion to polyester materials and other good performance; and it is convenient to apply and easy to repair, greatly reducing the long-term maintenance costs. At the same time, it is non-toxic and environmentally friendly in itself. It has excellent mattness after being added with a certain matte material, and can be used for bonding, sealing, insulating, waterproof protection and other purposes. Therefore, its application to EMAS facilities will have huge social and economic benefits.

SUMMARY OF THE INVENTION

According to use characteristics and quality requirements of the silicone coating special for EMAS required for the polyester cover plate, the present invention provides a matte weather resistant silicone coating special for EMAS, which is grey and has the properties such as low-viscosity, high flow, relatively fast curing, moderate strength, good adhesion, good mattness, environmental friendliness and the like.

The weather resistant matte silicone coating special for EMAS of the present invention comprises:
80~130 parts by weight, preferably 90~120 parts by weight, and more preferably 95~115 parts by weight of α,ω-dihydroxypolydimethylsiloxane;
0.5~10 parts by weight, preferably 0.8~7 parts by weight, and more preferably 1~3 parts by weight of linear polydimethylsiloxane with terminal hydroxyl group;
1~10 parts by weight, preferably 2~7 parts by weight, and more preferably 3~5 parts by weight of fumed silica;
10~50 parts by weight, preferably 13~40 parts by weight, and more preferably 15~30 parts by weight of precipitated silica;
1~5 parts by weight, and preferably 1.5~2.5 parts by weight of color masterbatch;
0.9≠5 parts by weight, and preferably 1~3 parts by weight of organotin chelate catalyst (e.g. dibutyltin dilaurate, dioctyltin dilaurate, stannous octoate, etc.);
crosslinking agent, comprising 1.5~7 parts by weight, preferably 2~6 parts by weight, preferably 3~5 parts by weight of methyltri(methylethylketoximino)silane, 1.5~7 parts by weight, preferably 2~6 parts by weight, preferably 3~5 parts by weight of vinyltri(methylethylketoximino)silane, and 1~7 parts by weight, preferably 2~6 parts by weight, and preferably 3~5 parts by weight of aminopropyltriethoxysilane;
1.5~6 parts by weight, and preferably 2~4 parts by weight of delustering agent (e.g. L-1030 (manufactured by TTK Co., Ltd., Korea), polyether-modified amine wax silane); and
250~350 parts by weight, and preferably 280~320 parts by weight of solvent. The solvent is, for example, a hydrocarbon and a petroleum ether solvent such as 120# gasoline, 200# gasoline or 90~120# petroleum ether.

In the present invention, methyltri(methylethylketoximino) silane, vinyltri(methylethylketoximino)silane, and aminopropyltriethoxysilane are used in combination as the crosslinking agent. The crosslinking agent methyltri (methylethylketoximino)silane has low reactivity, while vinyltri(methylethylketoximino)silane has higher reactivity, and the combination of both can effectively control the reaction rate. Aminopropyltriethoxysilane combines the effects of both crosslinking and thickening.

In the present invention, fumed silica and precipitated silica are used in combination. Fumed silica ($SiO_2$) has a more excellent reinforcing ability, but its flowability is relatively poor; and precipitated silica has poor reinforcing ability, but its flowability is relatively good. Mixed use cannot only achieve a good reinforcing effect, but also to ensure good flowability.

$\alpha,\omega$-dihydroxypolydimethylsiloxane in the present invention preferably use a low-viscosity $\alpha,\omega$-dihydroxypolydimethylsiloxane as base rubber, having a molecular weight range of 26,000~150,000, preferably 58,000~7,800, viscosity range of 1,000~150,000, preferably 8,000~18,000; and including a trade name of 107 glue, available from manufacturers of Japan Shin-Etsu, Toshiba, Jiangxi Xinghuo Organic Silicone Plant, and Zhejiang Xinan ChemicalIndustrial Group Co., Ltd.

The linear polydimethylsiloxane with terminal hydroxyl group used in the present invention has a molecular weight range of 2,000~139,000, preferably 20,000~30,000, viscosity range of 201~0,000, preferably 500~1,000, including a trade name of Dimethicone, available from manufacturers of Dow Corning, Wacker, Zhejiang Xinan Chemical Industrial Group Co., Ltd., and Jiangxi Xinghuo Organic Silicone Plant. With using it as an additive, increasing the hydroxyl content, using silica to reinforce, using aminopropyltriethoxysilane as a binder, adding special matting auxiliary, and supplemented by 120# gasoline, 200# gasoline or 90~120# petroleum ether as solvents and controlling the production process, a silicone coating special for EMAS can be obtained, which meets the requirements of good weather resistance, good matting effect, fast curing, moderate strength, good adhesion, environmental friendliness and the like.

Appearance: dark grey liquid, consistent with the color of EMAS;
Viscosity: 720 mPa·s, easy to spraying;
Tack-free time: 15 min (25° C., 50%), conducive to fast curing;
Shear strength: >1.3 MPa, well bonded to cement block, and effective waterproof;
Moderate strength: the cured coating has a tensile strength greater than 1.5 MPa, for example, 1.5 MPa-2.0 MPa, more preferably 1.55 MPa-1.9 MPa, and particularly preferably 1.6 MPa-1.8 MPa. The elongation is greater than 150%, for example, 150%-220%, preferably 155%-200%, and more preferably 160%-190%. Too low strength and too low elongation will lead to cracking, skinning and other hazards of cover plate coating; and too high strength and too high elongation will cause the wheel fail to crush, leading to EMAS system fail to work.
Matting effect: glossiness ≤30%, to ensure that the pilot's sight free from interference; and
Solid content: ≥25%, however, preferably, ≤40 wt %, and more preferably ≤35 wt %.

The viscosity (25° C.) of the coating is 500 mPa·s-900 mPa·s, preferably 600 mPa·s-800 mPa·s, and more preferably 680 mPa·s-740 mPa·s, for example, 720 mPa·s.
Environmental friendliness: no corrosion to the substrate and the like.

The other aspect of the present invention relates to a preparation method for a weather resistant matte silicone coating special for EMAS, comprising the steps of:
mixing and milling $\alpha,\omega$-dihydroxypolydimethylsiloxane, linear polydimethylsiloxane with terminal hydroxyl group, fumed silica, and precipitated silica; stirring and drying under vacuum at the temperature of 90~160° C. (e.g. 2-5 hours, preferably 3-4 hours); adding a color masterbatch, a catalyst, a crosslinking agent and a delustering agent at a temperature of 40~60° C. and then stirring (e.g. 20 minute to 2 hours, preferably 30 minutes to 1 hour, for example 30 minutes); and adding a solvent and further stirring to obtain a product.

In the present patent, a trifunctional crosslinking agent with reactivity is used for the silicone rubber. During silicone rubber vulcanization, under the action of the catalyst, there is condensation reaction between the crosslinking agent and the active terminal group of silicone rubber polymer. By removing the low-molecular material generated by the reaction, the cross-linked network of the silicone polymer is ultimately formed and the cross-linking vulcanization of silicone rubber is realized.

In this reaction, two problems need to be noticed:
1. The amount of cross-linking agent: among the formulated components of silicone rubber, part of the cross-linking agent is involved in the pre-condensation reaction, and a further considerable amount of excess crosslinking agent, which is small molecular reactive organosilane components, is also one of the indispensable components of single-component room-temperature vulcanized silicone rubber. Compared with high molecular chain of base rubber polymer, the small molecular crosslinking agent has relatively more reactivity, and will firstly react with trace water in the product packaging and other processes which may contact with trace water, and thus plays the role of water scavenger to avoid the early crosslinking in the process of silicone rubber packaging and functions as a stabilizer during silicone rubber storage.

When the crosslinking agent is below a certain critical concentration, the silicone rubber material is not crosslinked and vulcanized whether it is exposed to moisture or not because the crosslinking agent having low concentration is not sufficient to cause the silicone rubber polymer to form a crosslinked network. Appropriate concentration of crosslinking agent is necessary to ensure the normal reaction speed of crosslinking and vulcanization of silicone rubber. However, if the concentration of crosslinking agent is too high, a large number of excessive crosslinking agent will firstly consume water when the silicone rubber material is in contact with moisture in the air, which delays normal crosslinking reaction of silicone rubber, and thus will significantly slow down the crosslinking and vulcanization speed of silicone rubber.

2. Storage stability: since the deketoxime type RTV-1 silicone rubber generally has a storage period of less than 3 months. In order to solve this problem, the present application adds a linear polydimethylsiloxane with terminal hydroxyl group to a base rubber, adds the content of hydroxyl groups, and removes hydroxyl groups remained in the base rubber and the water carried by filler and the like, so as to improve storage stability of the rubber mixture.

The invention has the advantages of low viscosity, high flow, relatively fast curing, moderate strength, good adhesion, good mattness, environmental friendliness and other excellent characteristics.

In still another aspect, the present invention relates to a cured coating obtained by curing the above coating or a cured coating obtained by the above method. The tensile strength of the cured coating is 1.5 MPa-2.0 MPa, more preferably 1.55 MPa-1.9 MPa, and particularly preferably 1.6 MPa-1.8 MPa; and/or the elongation is greater than 150%, for example, 150%-220%, preferably 155%-200%, and more preferably 160%-190%.

DETAILED DESCRIPTION OF THE INVENTION

Hereinafter, the present invention will be described by way of examples. In the following examples, parts refer to parts by weight unless otherwise specified.

Example 1

90 parts of α,ω-dihydroxypolydimethylsiloxane (107 glue, number average molecular weight of 60,000, available from Japan Shin-Etsu), 1 part of linear polydimethylsiloxane with terminal hydroxyl group (dimethicone, number average molecular weight of 30,000, Dow Corning), 2 parts of fumed silica, and 15 parts of precipitated silica are mixed evenly in a kneading machine. The resulting rubber mixture is transferred to a three-roll machine and ground until it is uniform. The rubber mixture is then transferred to the kneading machine to stir at a rising temperature. The rubber mixture is maintained at a temperature of 100° C. and vacuum degree of ≥0.085 Mpa, stirred and vacuum dried for 3 hours, and placed into a planetary stirring kettle, when the seal temperature of the rubber mixture is within the range of 50° C., 2.2 parts of special color masterbatch (Chinese-made spray carbon black), 1 part of organotin chelate (dibutyltin dilaurate) as catalyst, and 2.5 parts of methyltri(methylethylketoximino)silane, 2.5 parts of vinyltri(methylethylketoximino)silane, and 2 parts of aminopropyltriethoxysilane as crosslinking agent are added thereto, and stirred at high speed for 20 minutes. 2.5 parts of delustering agent (L-1030) is further added and stirred at high speed for 20 minutes, and evacuated and stirred for 10 minutes, and 300 parts of 120# gasoline as solvent is then added, and stirred at high speed for 10 minutes to obtain a product.

Example 2

100 parts of α,ω-dihydroxypolydimethylsiloxane, 2 parts of linear polydimethylsiloxane with terminal hydroxyl group, 4 parts of fumed silica, and 20 parts of precipitated silica are mixed evenly in a kneading machine. The resulting rubber mixture is transferred to a three-roll machine and ground until it is uniform. The rubber mixture is then transferred to the kneading machine to stir at a rising temperature. The rubber mixture is maintained at a temperature of 120° C. and vacuum degree of ≥0.085 Mpa, stirred and vacuum dried for 3 hours, and placed into a planetary stirring kettle, when the seal temperature of the rubber mixture is within the range of 50° C., 2.2 parts of black color masterbatch, 1.5 parts of organotin chelate as catalyst, and 3 parts of methyltri(methylethylketoximino)silane, 3 parts of vinyltri(methylethylketoximino)silane, and 2.5 parts of aminopropyltriethoxysilane as crosslinking agent are added thereto, and stirred at high speed for 30 minutes. 3 parts of delustering agent (L-1030) is further added and stirred at high speed for 20 minutes, and evacuated and stirred for 10 minutes, and 300 parts of 200# gasoline is then added, and stirred at high speed for 10 minutes to obtain a product.

Example 3

110 parts of α,ω-dihydroxypolydimethylsiloxane, 3 parts of linear polydimethylsiloxane with terminal hydroxyl group, 5 parts of fumed silica, and 25 parts of precipitated silica are mixed evenly in a kneading machine. The resulting rubber mixture is transferred to a three-roll machine and ground until it is uniform. The rubber mixture is then transferred to the kneading machine to stir at a rising temperature. The rubber mixture is maintained at a temperature of 150° C. and vacuum degree of ≥0.085 Mpa, stirred and vacuum dried for 3 hours, and placed into a planetary stirring kettle, when the seal temperature of the rubber mixture is within the range of 50° C., 2.2 parts of black color masterbatch, 2.5 parts of organotin chelate as catalyst, and 3.5 parts of methyltri(methylethylketoximino)silane, 3 parts of vinyltri(methylethylketoximino)silane, and 3 parts of aminopropyltriethoxysilane as crosslinking agents are added thereto, and stirred at high speed for 30 minutes. 3.5 parts of delustering agent (L-1030) is further added and stirred at high speed for 20 minutes, and evacuated and stirred for 10 minutes, and 300 parts of 90~120# petroleum ether is then added, and stirred at high speed for 10 minutes to obtain a product.

Comparative Example 1

100 parts of α,ω-dihydroxypolydimethylsiloxane, 2 parts of linear polydimethylsiloxane with terminal hydroxyl group, 4 parts of fumed silica, and 20 parts of precipitated silica are mixed evenly in a kneading machine. The resulting rubber mixture is transferred to a three-roll machine and ground until it is uniform. The rubber mixture is then transferred to the kneading machine to stir at a rising temperature. The rubber mixture is maintained at a temperature of 120° C. and vacuum degree of ≥0.085 Mpa, stirred and vacuum dried for 3 hours, and placed into a planetary stirring kettle, when the seal temperature of the rubber mixture is within the range of 50° C., 2.2 parts of black color masterbatch, 1.5 parts of organotin chelate as catalyst, and 3 parts of methyltri(methylethylketoximino)silane, 3 parts of vinyltri(methylethylketoximino)silane, and 2.5 parts of aminopropyltriethoxysilane as crosslinking agents are added thereto, and stirred at high speed for 30 minutes. 300 parts of 120# gasoline as solvent is further added, and stirred at high speed for 10 minutes to obtain a product. Since the delustering agent is not added, the product has no matting effect.

Comparative Example 2

100 parts of α,ω-dihydroxypolydimethylsiloxane, 2 parts of linear polydimethylsiloxane with terminal hydroxyl group, 4 parts of fumed silica, and 20 parts of precipitated silica are mixed evenly in a kneading machine. The resulting rubber mixture is transferred a three-roll machine and ground until it is uniform. The rubber mixture is then transferred to the kneading machine to stir at a rising temperature. The rubber mixture is maintained at a temperature of 120° C. and vacuum degree of ≥0.085 Mpa, stirred and vacuum dried for 3 hours, and placed into a planetary stirring kettle, when the seal temperature of the rubber mixture is within the range of 50° C., 2.2 parts of black color masterbatch, 1.5 parts of organotin chelate as catalyst, and 3 parts of methyltri(methylethylketoximino)silane, 3 parts of vinyltri(methylethylketoximino)silane, and 2.5 parts of aminopropyltriethoxysilane as crosslinking agents are added thereto, and stirred at high speed for 30 minutes. 3 parts of tung oil is further added and stirred at a high speed for 20 minutes, and 300 parts of 120# gasoline as solvent is further added and stirred at high speed for 10 minutes to obtain a product. The use of tung oil as a delustering agent has poor matting effect.

Comparative Example 3

100 parts of α,ω-dihydroxypolydimethylsiloxane, 2 parts of linear polydimethylsiloxane with terminal hydroxyl group, 4 parts of fumed silica, and 20 parts of precipitated silica are mixed evenly in a kneading machine. The resulting rubber mixture is transferred to a three-roll machine and ground until it is uniform. The rubber mixture is then transferred to the kneading machine to stir at a rising temperature. The rubber mixture is maintained at the temperature of 120° C. and vacuum degree of ≥0.085 Mpa, stirred and vacuum dried for 3 hours, and placed into a planetary stirring kettle, when the seal temperature of the rubber mixture is within the range of 50° C., 2.2 parts of black color masterbatch, 1.5 parts of organotin chelate as catalyst, and 3 parts of methyltri(methylethylketoximino) silane, 3 parts of vinyltri(methylethylketoximino)silane, and 2.5 parts of aminopropyltriethoxysilane as crosslinking agents are added thereto, and stirred at high speed for 30 minutes. 3 parts of extinction powder (TS100) is added and stirred at a high speed for 20 minutes; and 300 parts of 120# gasoline as solvent is further added, and stirred at high speed for 10 minutes to obtain a product. In this example, extinction powder was used as a delustering agent, and the matting effect was poor.

Comparative Example 4

100 parts of α,ω-dihydroxypolydimethylsiloxane (107 glue, number average molecular weight of 60,000, Japan Shin-Etsu), 1 part of linear polydimethylsiloxane with terminal hydroxyl group (Qingdao Zhongbao Chemical Co., Ltd.), 2 parts of fumed silica, and 15 parts of precipitated silica are mixed evenly in a kneading machine. The resulting rubber mixture is transferred to a three-roll machine and ground until it is uniform. The rubber mixture is then transferred to the kneading machine to stir at a rising temperature. The rubber mixture is maintained at a temperature of 100° C. and vacuum degree of ≥0.085 Mpa, stirred and vacuum dried for 3 hours, and placed into a planetary stirring kettle, when the seal temperature of the rubber mixture is within the range of 50° C., 2.2 parts of special color masterbatch (Chinese-made spray carbon black), 1 part of organotin chelate (dibutyltin dilaurate) as catalyst, and 2.5 parts of methyltri(methylethylketoximino)silane, 2.5 parts of vinyltri(methylethylketoximino)silane, and 2 parts of aminopropyltriethoxysilane as crosslinking agents are added thereto, and stirred at high speed for 20 minutes. 2.5 parts of delustering agent (L-1030) is further added, and stirred at high speed for 20 minutes, and evacuated and stirred for 10 minutes; and 300 parts of 120# gasoline as solvent is then added and stirred at high speed for 10 minutes to obtain a product.

Comparative Example 5

90 parts of α,ω-dihydroxypolydimethylsiloxane (107 glue, molecular weight of 60,000, Japan Shin-Etsu), 1 part of linear polydimethylsiloxane with terminal hydroxyl group (dimethicone, molecular weight of 30,000, Dow Corning), 2 parts of fumed silica, and 15 parts of precipitated silica are mixed evenly in a kneading machine. The resulting rubber mixture is transferred to a three-roll machine and ground until it is uniform. The rubber mixture is then transferred to the kneading machine to stir at a rising temperature. The rubber mixture is maintained at the temperature of 100° C. and vacuum degree of ≥0.085 Mpa, stirred and vacuum dried for 3 hours, and placed into a planetary stirring kettle, when the seal temperature of the rubber mixture is within the range of 50° C., 2.2 parts of special color masterbatch (Chinese-made spray carbon black), 1 part of organotin chelate (dibutyltin dilaurate) as catalyst, and 2.5 parts of methyltri(methylethylketoximino) silane, and 5 parts of vinyltri(methylethylketoximino)silane as crosslinking agents are added thereto, and stirred at high speed for 20 minutes. 2.5 parts of delustering agent (L-1030) is further added and stirred at high speed for 20 minutes, and evacuated and stirred for 10 minutes, and 300 parts of 120# gasoline as solvent is added, and stirred at high speed for 10 minutes to obtain a product.

Comparative Example 6

90 parts of α,ω-dihydroxypolydimethylsiloxane (107 glue, molecular weight of 60,000, Japan Shin-Etsu), 15 parts of linear polydimethylsiloxane with terminal hydroxyl group (dimethicone, molecular weight of 30,000, Dow Corning), 2 parts of fumed silica, and 15 parts of precipitated silica are mixed evenly in a kneading machine. The resulting rubber mixture is transferred to a three-roll machine and ground until it is uniform. The rubber mixture is then transferred to the kneading machine to stir at a rising temperature. The rubber mixture is maintained at a temperature of 100° C. and vacuum degree of ≥0.085 Mpa, stirred and vacuum dried for 3 hours, and placed into a planetary stirring kettle, when the seal temperature of the rubber mixture is within the range of 50° C., 2.2 parts of special color masterbatch (Chinese-made spray carbon black), 1 part of organotin chelate (dibutyltin dilaurate) as catalyst, and 2.5 parts of methyltri(methylethylketoximino)silane, 2.5 parts of vinyltri(methylethylketoximino)silane, and 2 parts of aminopropyltriethoxysilane as crosslinking agent are added thereto, and stirred at high speed for 20 minutes. 2.5 parts of delustering agent (L-1030) is further added and stirred at high speed for 20 minutes, and evacuated and stirred for 10 minutes, and 300 parts of 120# gasoline as solvent is then added, and stirred at high speed for 10 minutes to obtain a product.

Property Detection:

The prepared rubber mixture is poured into a tank and levels naturally to form a sheet with an average thickness of 2 mm, and is vulcanized for 7 days at room temperature. The vulcanized sheet is cut into dumbbell-shaped samples. The tensile strength and elongation at break of the samples are measured by an electronic universal test machine according to GB/T 528 standard, with a tensile rate of 50 mm/min; and tack-free time is measured according to GB/T 13477.5-2002 standard.

Mattness: the special silicone coating is sprayed on the polyester cover plate, with the cured coating thickness of 0.2~0.25 mm; at 7 days after curing, the cover plate is irradiated with a flashlight at an angle of 45 degrees relative to the cover plate, and glossiness is detected and compared with the standard model; and if the matting effect is poor than the standard model, it is regarded as unqualified; if it is consistent with the standard model or better, it is regarded as qualified.

According to the experiment, it is found that the requirements of EMAS are as follows: the tack-free time cannot be longer than 30 minutes, the glossiness is less than 30%, the viscosity is 700~840 mPa·s, the shear strength is not less than 1.2 Mpa, tensile strength is 1.5-2 Mpa, elongation is 150-200%, hardness is 25-35, and solid content is not less than 25%.

Results and Discussion:
1. Comparison of the Product with the Control:

TABLE 1

Comparison of Examples and Comparative Examples on Application Performance

| Performance | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|
| Tack-free time min (25° C., 60%) | 15 | 16 | 16 | 20 | 35 | 20 | 8 | 25 |
| Viscosity s | 720 | 720 | 720 | 700 | 750 | 750 | 700 | 700 |
| Glossiness % | 15 | 17 | 100 | 80 | 30 | 15 | 15 | 20 |
| Tensile strength MPa | 1.8 | 1.7 | 1.7 | 1.3 | 2.5 | 2.1 | 2.4 | 1.2 |
| Elongation % | 180 | 180 | 180 | 150 | 100 | 140 | 120 | 220 |
| Shore A hardness | 30 | 30 | 30 | 30 | 40 | 33 | 35 | 23 |
| Solid content % | 25 | 25 | 25 | 25 | 25 | 25 | 25 | 25 |

It can be seen that the gossiness of Comparative Example 1 and 2 is too large to meet the requirement of mattness; Comparative Example 2 has relatively low strength, and Comparative Example 3 has relatively high strength and relatively low elongation, which does not meet the requirements of strength from customers; Comparative Example 3 has too long tack-free time, which does not meet the construction requirements; Comparative Example 4 and 5 have relatively too high strength and insufficient elongation, and Comparative Example 6 has relatively low strength and hardness; and only the indicators of Examples meet the EMAS requirements.

2. Effect of Different Parts by Weight of Crosslinking Agent on the Product Curing Speed:

TABLE 2

Relation of Different Parts by Weight of Crosslinking Agent and Product Curing Speed

| Formulations | 1# | 2# | 3# | 4# |
|---|---|---|---|---|
| Base rubber | 100 | 100 | 100 | 100 |
| Organotin chelate | 0.5-0.8 | 1-1.5 | 1.5-2 | 2-3 |
| Methyltri(methylethylketoximino)silane | 0.5-1 | 2-3.5 | 3.5-5 | 5-7 |
| Vinyltri(methylethylketoximino)silane | 0.5-1 | 2-3.5 | 3.5-5 | 5-7 |
| Tack-free time min (25° C., 60%) | 50 | 35 | 20 | 10 |
| Surface condition after curing | Sticky | Not sticky | Not sticky | Not sticky |

It can be seen that where the crosslinking agent is below a certain critical concentration, the silicone rubber material is not crosslinked and vulcanized whether it is exposed to moisture or not because the crosslinking agent having low concentration is not sufficient to cause the silicone rubber polymer to form a crosslinked network; and if the crosslinking agent concentration is too large, and the silicone rubber material is in contact with moisture in the air, a large number of excessive crosslinking agent will firstly consume water, which delays normal crosslinking reaction of silicone rubber, and thus will significantly slow down the crosslinking and vulcanization speed of the weather resistant silicone coating. Base rubber comprises α,ω-dihydroxypolydimethylsiloxane and linear polydimethylsiloxane with terminal hydroxyl group.

3. Experiment on Product Thermally Aging

TABLE 3

Thermally Aging Performance of Example 1 Product

| Performance | Room temperature | 200° C. × 24 h | 250° C. × 72 h |
|---|---|---|---|
| Hardness Shore A | 30 | 28 | 25 |
| Tensile strength MPa | 1.8 | 1.7 | 1.5 |
| Elongation % | 180 | 175 | 150 |
| Shear strength Mpa | 1.5 | 1.4 | 1.4 |

It can be seen that the hardness, tensile strength, elongation and shear strength on aluminum etc. of the product vulcanized in Example 1 are not changed much after the experiment on heat aging at 200° C.×24 h, and its performance still can be maintained especially after high temperature aging at 250° C.×72 h.

4. Storage Stability of Products

TABLE 4

Storage performance of Example 1 products

| Performance | Initial performance | Stored for 7 days at 70° C. | Stored for 6 months at 20° C. |
|---|---|---|---|
| Tack-free time min (25° C., 60%) | 15 | 14 | 13 |

TABLE 4-continued

Storage performance of Example 1 products

| Performance | Initial performance | Stored for 7 days at 70° C. | Stored for 6 months at 20° C. |
|---|---|---|---|
| Shore A hardness | 30 | 29 | 29 |
| Tensile strength MPa | 1.8 | 1.7 | 1.7 |
| Elongation % | 180 | 180 | 180 |
| Shear strength MPa | 1.5 | 1.5 | 1.4 |

It can be seen that after six months of storage, its main performance is not changed too much because of the adding of linear polydimethylsiloxane with terminal hydroxyl group, adding of hydroxyl content, and removing remained hydroxyls in the base rubber and the water carried by filler and the like to improve storage stability of the rubber mixture.

The invention claimed is:

1. A weather resistant matte silicone coating special for EMAS, comprising:
   80-130 parts by weight of α,ω-dihydroxypolydimethylsiloxane;
   0.5-10 parts by weight of linear polydimethylsiloxane with terminal hydroxyl group;
   1-10 parts by weight of fumed silica;
   10-50 parts by weight of precipitated silica;
   1-5 parts by weight of color masterbatch; 0.9-5 parts by weight of organotin chelate catalyst;
   crosslinking agent, comprising 1.5-7 parts by weight of methyltri(methylethylketoximino)silane, 1.5-7 parts by weight of vinyltri(methylethylketoximino)silane, and 1-7 parts by weight of aminopropyltriethoxysilane;
   1.5-6 parts by weight of delustering agent; and
   250-350 parts by weight of solvent.

2. The weather resistant matte silicone coating as claimed in claim 1, wherein the α,ω-dihydroxypolydimethylsiloxane is a low-viscosity α,ω-dihydroxypolydimethylsiloxane having a number-average molecular weight range of 26,000-150,000 and a viscosity range of 1,000-150,000 cP at 25° C.

3. The weather resistant matte silicone coating as claimed in claim 1, wherein the linear polydimethylsiloxane with terminal hydroxyl group has a number-average molecular weight range of 2,000-139,000 and a viscosity range of 20-10,000 cP at 25° C.

4. The weather resistant matte silicone coating as claimed in claim 1, wherein the catalyst is selected from dibutyltin dilaurate, dioctyltin dilaurate, or stannous octoate.

5. The weather resistant matte silicone coating as claimed in claim 1, wherein the solvent is a hydrocarbon or a petroleum ether solvent; and/or the color masterbatch is carbon black.

6. The weather resistant matte silicone coating as claimed in claim 1, wherein the delustering agent is polyether-modified amine wax silane;
   and/or
   the solid content of the coating is 25-40 wt %; and/or
   the viscosity (25° C.) of the coating is from 500 mPa·s to 900 mPa·s.

7. A method for preparing the weather resistant matte silicone coating as claimed in claim 1, wherein the method comprises the steps of: mixing and milling α,ω-dihydroxypolydimethylsiloxane, linear polydimethylsiloxane with terminal hydroxyl group, fumed silica, and precipitated silica; stirring and drying under vacuum at a temperature of 90-160° C.; adding the color masterbatch, catalyst, crosslinking agent and delustering agent at a temperature of 40-60° C. and stirring, and further adding the solvent and stirring to obtain a product.

8. A method for preparing a cured coating of the weather resistant matte silicone coating as claimed in claim 1, wherein the method comprises the steps of:
   mixing and milling α,ω-dihydroxypolydimethylsiloxane, linear polydimethylsiloxane with terminal hydroxyl group, fumed silica, and precipitated silica; stirring and drying under vacuum at a temperature of 90-160° C.; adding the color masterbatch, catalyst, crosslinking agent and delustering agent at a temperature of 40-60° C. and stirring; and further adding the solvent and stirring; and then curing to obtain a product of the cured coating.

9. The cured coating obtained by curing the weather resistant matte coating claimed in claim 1, wherein the tensile strength of the cured coating is 1.5 MPa-2.0 MPa; and/or the elongation of the cured coating is greater than 150%.

10. The weather resistant matte silicone coating as claimed in claim 1, comprising:
    90-120 parts by weight of α,ω-dihydroxypolydimethylsiloxane;
    0.8-7 parts by weight of linear polydimethylsiloxane with terminal hydroxyl group;
    2-7 parts by weight of fumed silica;
    13-40 parts by weight of precipitated silica;
    1.5-2.5 parts by weight of color masterbatch;
    1-3 parts by weight of organotin chelate catalyst;
    crosslinking agent, comprising 2-6 parts by weight of methyltri(methylethylketoximino)silane, 2-6 parts by weight of vinyltri(methylethylketoximino)silane, and 2-6 parts by weight of aminopropyltriethoxysilane;
    2-4 parts by weight of delustering agent; and
    280-320 parts by weight of solvent.

11. The weather resistant matte silicone coating as claimed in claim 1, comprising:
    95-115 parts by weight of α,ω-dihydroxypolydimethylsiloxane;
    1-3 parts by weight of linear polydimethylsiloxane with terminal hydroxyl group;
    3-5 parts by weight of fumed silica;
    15-30 parts by weight of precipitated silica;
    1.5-2.5 parts by weight of color masterbatch;
    1-3 parts by weight of organotin chelate catalyst;
    crosslinking agent, comprising 3-5 parts by weight of methyltri(methylethylketoximino)silane, 3-5 parts by weight of vinyltri(methylethylketoximino)silane, and 3-5 parts by weight of aminopropyltriethoxysilane;
    2-4 parts by weight of delustering agent; and
    280-320 parts by weight of solvent.

12. The weather resistant matte silicone coating as claimed in claim 5, wherein the solvent is selected from the group consisting of 120# gasoline, 200# gasoline, and 90-120# petroleum ether.

* * * * *